United States Patent [19]

Kim

[11] Patent Number: 5,343,245
[45] Date of Patent: Aug. 30, 1994

[54] DIGITAL CLAMP CIRCUIT FOR CLAMPING BASED ON THE LEVEL OF AN OPTICAL BLACK PERIOD OF A PICTURE SIGNAL

[75] Inventor: Ki-Yong Kim, Kyonggi-do, Rep. of Korea

[73] Assignee: Samsung Electronics Co., Ltd., Kyongki-do, Rep. of Korea

[21] Appl. No.: 986,577

[22] Filed: Dec. 7, 1992

[30] Foreign Application Priority Data

Dec. 5, 1991 [KR] Rep. of Korea ............ 91-21758

[51] Int. Cl.⁵ .............................................. H04N 5/18
[52] U.S. Cl. .................................. 348/257; 348/695
[58] Field of Search ............... 358/171, 172, 173, 174; 348/691, 695, 257; H04N 5/18

[56] References Cited

U.S. PATENT DOCUMENTS

| | | | |
|---|---|---|---|
| 4,124,869 | 11/1978 | Heitmann | 358/171 |
| 4,473,839 | 9/1984 | Noda | 358/41 |
| 5,010,395 | 8/1991 | Tsuji et al. | 358/41 |
| 5,192,885 | 3/1993 | Gay | 358/172 |

FOREIGN PATENT DOCUMENTS

| | | | |
|---|---|---|---|
| 241375 | 11/1985 | Japan | 358/171 |
| 293076 | 11/1989 | Japan | 358/171 |
| 55475 | 2/1990 | Japan | H04N 5/18 |
| 0108875 | 5/1991 | Japan | 358/171 |
| 3276972 | 12/1991 | Japan | H04N 5/16 |
| 2249236 | 4/1992 | United Kingdom | H04N 5/18 |

*Primary Examiner*—Mark R. Powell
*Assistant Examiner*—Chris Grant
*Attorney, Agent, or Firm*—Sughrue, Mion, Zinn, Macpeak & Seas

[57] ABSTRACT

A digital clamp circuit obtains a variation value of the black level varying per 1H period according to a predetermined clamp reference value, adds the variable value to an entire signal level to perform compensation of the variation of the black level, thereby enabling stable signal processing.

6 Claims, 2 Drawing Sheets

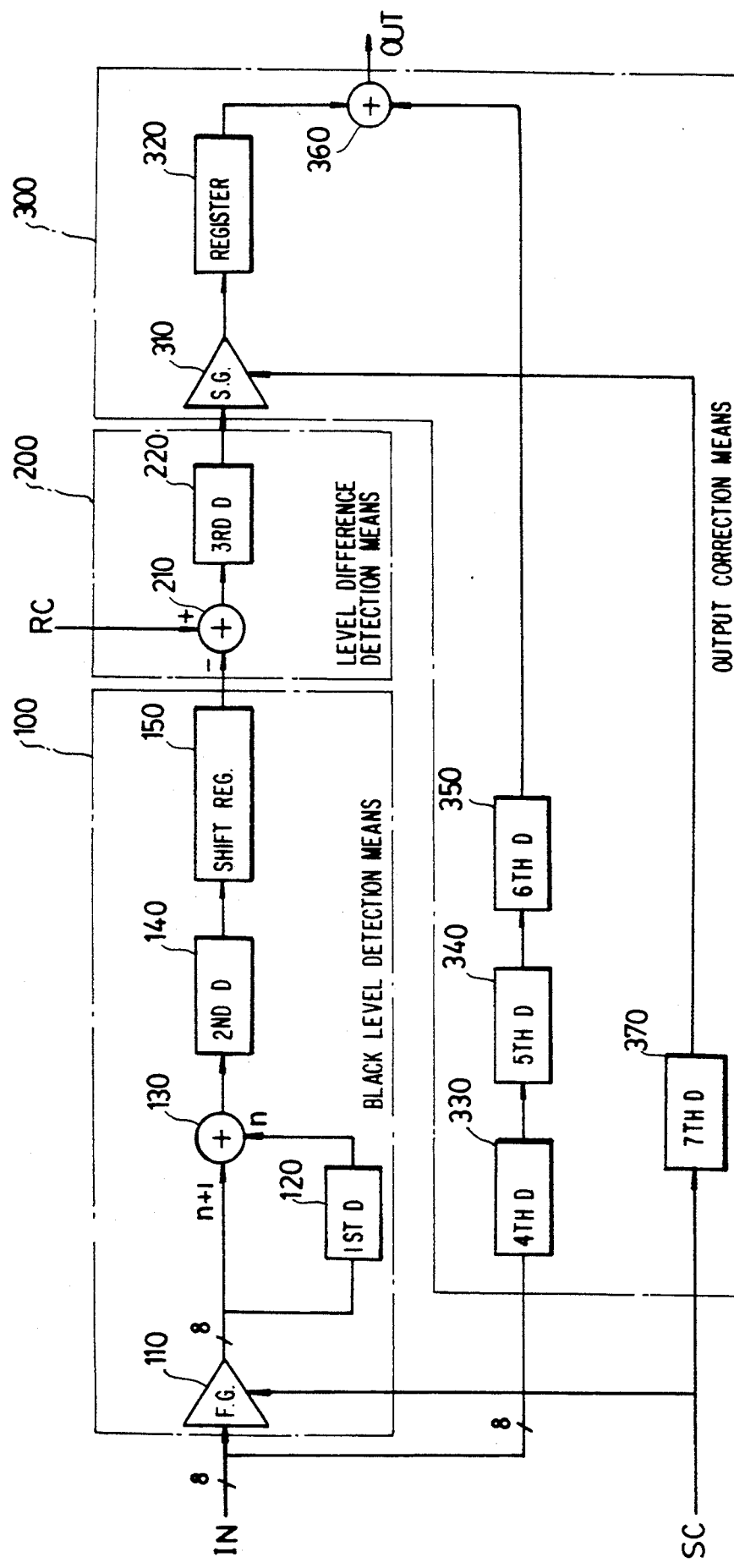

DIGITAL CLAMP CIRCUIT FOR CLAMPING
BASED ON THE LEVEL OF AN OPTICAL BLACK
PERIOD OF A PICTURE SIGNAL

FIELD OF THE INVENTION

The present invention relates to a video camera, and more particularly to a digital clamp circuit of a video camera which can process digital signals.

BACKGROUND OF THE INVENTION

Generally, in the case of a digital video camera, the signal outputted from a CCD (Charge Coupled Device) of a picture pickup is an analog signal. This analog signal is converted to a digital signal for signal processing. The signal processing is performed after the digital signal is fixed on a predetermined level by a clamp means.

A digital clamp circuit is connected to receive an output of an A/D converter (Analog to Digital Converter) which converts the analog CCD output to a digital signal in a digital camera. After the black level detected from the output signal and a reference black level are compared with each other, the digital clamp circuit compensates and clamps as much as the difference thereof against a signal component of 1 H period.

In other words, in the case of a digital video camera, an analog method is applicable to a CCD of a picture pickup, the output level of which can thereby be changed per 1 H (1 horizontal period).

Accordingly, the output level is compensated based on a value of an Optical Black Period set up per 1 H by the clamp circuit.

However, if the entire level of 1 H period is changed, the value of an optical black period also changes, thereby requiring compensation thereto. Specifically, a dark current is included in the output circuit of the camera tube, and this dark current varies in response to ambient temperatures. As a result of the variation of the dark current, the black level changes, and the balance of the black region in the image signal also changes, thereby decreasing the picture quality. The dark current can be represented in an optical black level during the optical black period which necessitates the optical black level to be fixed on a predetermined level at all times. However, when the overall level of 1 H period changes, the optical black level of the optical black period also changes, thereby requiring compensation.

SUMMARY OF THE INVENTION

Accordingly, in view of the above, it is an object of the present invention to provide a digital clamp circuit wherein a black level of an optical black period is fixed on a determined level in every 1 H (horizontal) period whereby an overall signal level within 1 H period is clamped on the level thereof.

In order to attain the aforementioned object, the digital clamp circuit according to the present invention includes:

a black level detection circuit or means for obtaining the level of an optical black period from the picture signal converted to a digital signal after being outputted from a CCD;

a level difference detection circuit or means for obtaining the difference between the level detected from the black level detection means and a clamp reference value; and an output correction circuit or means for correcting and outputting thereafter the entire levels of picture signals inputted by the level difference detection means.

BRIEF DESCRIPTION OF THE DRAWINGS

For a fuller understanding of the nature and objects of the present invention, reference should be made to the following detailed descriptions taken in conjunction with the accompanying drawings in which:

FIG. 1 is a digital clamp circuit drawing in accordance with the present invention.

DETAILED DESCRIPTION OF THE PREFERRED EMBODIMENT

Figure 2A:
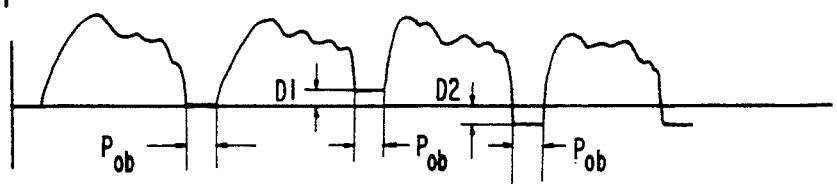
FIGS. 2A to 2H, inclusive, are timing charts of FIG. 1.

FIG. 1 shows an embodiment of a digital clamp circuit drawing in accordance with the present invention.

According to FIG. 1, the digital clamp circuit includes:

a black level detection circuit or means 100 for detecting the level of the optical black period from the picture signals which have been converted to digital signals after being outputted from a CCD;

a level difference detection circuit or means 200 for obtaining the difference between the level detected from the black level detection means 100 and a clamp reference value Rc; and an output correction circuit or means 300 for correcting and thereafter outputting the entire levels of picture signals inputted IN by the difference obtained from the level difference detection circuit or means 200.

The black level detection circuit or means 100 includes:

a first gate 110 for outputting only the data of the optical black period from the digital picture signals IN which have been converted to digital signals after being outputted from a CCD of a picture pickup;

a first delayer 120 for delaying the data outputted from the first gate 110;

a first adder 130 for adding the data outputted from the first gate 110 to the data delayed at the first delayer 120;

a second delayer 140 for delaying the data outputted from the first adder 130; and a shift register 150 for obtaining the mean value level of the optical black period by dividing the data delayed at the second delayer 140.

The level difference detection means 200 comprises a subtracter 210 for obtaining the difference between a predetermined clamp reference value Rc and the black level detected by the black level detection means or circuit 100, and a third delayer 220 for delaying the level difference obtained from the subtracter 210.

The output correction means or circuit 300 comprises a second gate 310 for controlling the output of the level difference detected from the level difference detection means or circuit 200, a register 320 for outputting for 1 H period after storing the level difference outputted from the second gate 310, and a second adder 360 for correcting the output level by adding the level difference stored in the register 320 to the input IN image signal delayed by fourth, fifth and sixth delayers 330, 340 and 350, respectively.

The first gate 110 is controlled by a clamp signal Sc and outputs only the digital data of the optical black period. The clamp signal Sc is generated by, for example, an IC-equipped synchronizing signal generating circuit. A face plate of the charge coupled device is classified into a signal pixel portion (composed of 514 pixels) and a black reference pixel portion (usually composed of 20 pixels). The clamp signal Sc is generated at the time of passing from the signal pixel portion to the black reference pixel portion during horizontal scanning.

The second gate 310 outputs the level difference detected by the level difference detection means or circuit 200 by dint of the clamp signal Sc delayed at a seventh delayer 370 during the signal processing period in the black level detection circuit or means 100 and level difference detection circuit or means 200.

The delayers are all full-bit delayers and the digits of the delayers can be changed according to the delayed time generated from actual signal processing procedures.

With reference to the timing charts illustrated in FIGS. 2A to FIG. 2H, the operation of the digital clamp circuit shown in FIG. 1 will now be explained.

The picture signal outputted from the CCD of the picture pickup in the digital video camera comprises, as illustrated in FIG. 2A, a picture signal and a signal outputted during the optical black period Pob.

The clamp circuit or means, as illustrated in FIG. 2A, fixes the picture signal on a predetermined potential DC Ref.

Figure 2B:
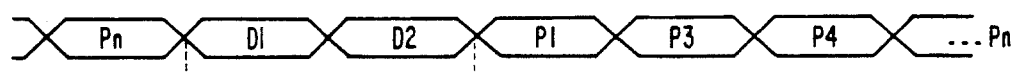

In other words, the analog signal outputted from the CCD as illustrated in FIG. 2A is converted to a digital signal at the A/D converter and is inputted as a digital signal IN to the clamp circuit means as illustrated in FIG. 2B.

P1~Pn represent the picture signals converted to digital signals, and D1, D2 represent the black signals outputted from the optical black period Pob as shown in FIG. 2A, which correspond respectively to one pixel of the CCD.

The signals thus converted to digital signals as mentioned above are inputted IN to the black level detection circuit or means 100 of the clamp circuit and to the output correction circuit or means 300.

The digital signals inputted to the black level detection circuit or means 100 are, in turn, inputted to the first gate 110.

Figure 2C:

As illustrated in FIG. 2C, the first gate 110 is controlled by the clamp signal Sc inputted during the optical black period, thereby outputting only black signals D1, D2 from the digital data as depicted in FIG. 2B.

The black signals D1, D2 outputted from the first gate 110 are inputted to the first adder 130 and simultaneously are delayed at the first delayer 120 which inputs the delayed signals to the first adder 130.

Accordingly, the first adder 130 adds the nth data D1 (delayed at the first delayer 120) to the n+1th data D2 which has passed through the first gate 110 and then outputs the added data (n+(n+1)).

The second delayer 140 delays the data added at the adder 130 and then outputs the delayed data to the shift register 150.

The reason the nth data D1 delayed at the first delayer 120 is added to n+1th data D2 which has passed through the first gate 110 is to detect the black level by way of two pixels.

Figure 2D:
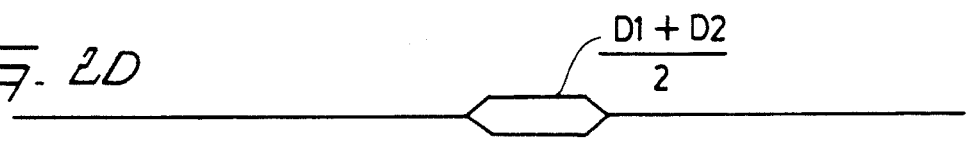

The shift register 150 operates, as depicted in FIG. 2D, to divide by two the data outputted from the second delayer 140 by dint of a 1 bit right shift.

The output of the shift register 150, as shown in FIG. 2D, is inputted to the subtracter 210 of the level difference detection circuit 200.

The subtracter 210 obtains and outputs the difference between the black level outputted from the shift register 150 of the black level detection circuit 100 and the predetermined clamp reference value Rc.

The output of the subtracter 210 is delayed at a third delayer 220 (FIG. 2E) and then s inputted to the second gate 310 of the output correction circuit 300.

Figure 2E:
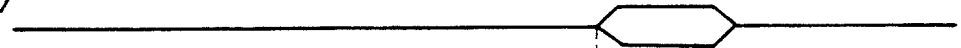
Figure 2F:
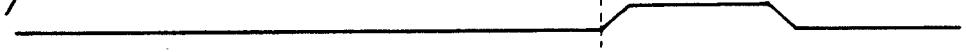

FIG. 2F shows the control signal (clamp signal Sc) which controls the second gate 310.

Specifically, the clamp signal Sc is delayed at a seventh delayer 370 and then the delayed signal is inputted as a control signal to the second gate 310.

Accordingly, as illustrated in FIG. 2E, the data against the difference between the black level obtained in the level difference detection circuit 200 and the clamp reference value Rc, as explained in FIG. 2F, passes through the second gate by dint of the control signal and is inputted to register 320.

Figure 2G:

The register 320 stores the data inputted by way of passing through the second gate 310, and as illustrated in FIG. 2G, continuously outputs the data during 1 H period to the adder 360.

At this point, the signals outputted from the CCD and converted to digital signals (as depicted in FIG. 2B) are delayed at the fourth, fifth and sixth delayers 330, 340, 350 and then are inputted to the second adder 360. The fourth, fifth and sixth delayers 330, 340 and 350 have delay times such that the total delay time of delayers, 330, 340 and 350 corresponds to the time it takes the original signal to propagate through the black level detection circuit 100, the level difference detection circuit 200, the second gate 310 and the register 340. In other words, the adder 360 receives both of its inputs at the same time.

Figure 2H:
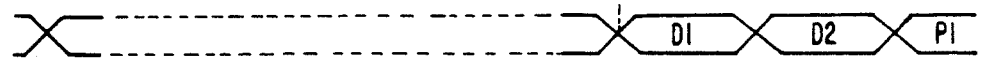

The signals delayed by the delaying time of the fourth, fifth and sixth delayers 330, 340, 350 are shown in FIG. 2H.

The adder 360 adds its two input signals, i.e., the signals as depicted in FIGS. 2G, 2H. Namely, the adder 360 outputs OUT the level-corrected signals by adding the difference between the detected black level and the predetermined clamp reference value to the entire output level.

As described above, the present invention obtains the variable value of the black level varying per 1 H period by the clamp reference value, and then adds the variable value to the entire signal level, thereby enabling stable signal processing by performing compensation against the variation of the black level.

The foregoing description of a preferred embodiment of the invention has been presented for the purpose of illustration and description. It is not intended to limit the scope of this invention. Many modifications and variations are possible in light of above teaching as will be apparent to those skilled in the art.

For example, while the delayer has been described in detail, the delayer can usually be added or subtracted in accordance with the signal processing.

What is claimed is:

1. A digital clamp circuit of a digital video camera comprising:
black level detection means, coupled to receive a picture signal that has been converted to a digital signal, for obtaining a level of an optical black period from the picture signal;

level difference detection means for obtaining a difference between the level detected from said black level detection means and a predetermined clamp reference value; and output correction means for correction entire levels of the picture signal in accordance with the difference obtained from said level difference detection means, wherein said black level detection means comprises:

a first gate for outputting only data corresponding to the optical black period;

a first delayer for delaying the data outputted from said first gate;

a first adder for adding the data outputted from said first gate and the data delayed at said first delayer;

a second delayer for delaying data outputted from said first adder; and a shift register for obtaining an average level value of the optical black period in accordance with an output of said second delayer.

2. The digital clamp circuit of a digital video camera as defined in claim 1, wherein said first gate is controlled by a generated clamp signal to output only the data of the optical black period.

3. The digital clamp circuit of a digital video camera as defined in claim 1, wherein said level difference detection means comprises:

a subtracter for obtaining a level difference between the predetermined clamp reference value and the black level detected by said black level detection means; and a delayer for delaying the level difference obtained from said subtracter.

4. A digital clamp circuit of a digital video camera comprising:

black level detection means, coupled to receive a picture signal that has been converted to a digital signal, for obtaining a level of an optical black period from the picture signal;

level difference detection means for obtaining a difference between the level detected from said black level detection means and a predetermined clamp reference value; and output correction means for correction entire levels of the picture signal in accordance with the difference obtained from said level difference detection means, wherein said output correction means comprises:

a gate for controlling the level difference detected by said level difference detection means;

a register for outputting the level difference for 1 H period after storing the level difference outputted from said gate;

a first delay means for delayign the picture signal that has been converted to the digital signal;

a adder for correcting an output level by adding the level difference stored in said register to an output of said first delay means.

5. The digital clamp circuit of a digital video camera as defined in claim 4, further comprising a second delay means for delaying a generated clamp signal, and wherein said gate outputs the level difference detected by said level difference detection means in accordance with an output of said second delay means.

6. A digital clamp circuit of a digital video camera comprising:

black level detection means, coupled to receive a picture signal that has been converted to a digital signal, for obtaining a level of an optical black period from the picture signal, said black level detection means being operable only during the optical black period;

level difference detection means for obtaining a difference between the level detected from said black level detection means and a predetermined clamp reference value; and output correction means for correcting entire levels of the picture signal in accordance with the difference obtained from said level difference detection means, and wherein said level difference detection means comprises:

a subtracter for obtaining a level difference between the predetermined clamp reference value and the black level detected by said black level detection means; and a delayer for delaying the level difference obtained from said subtracter.

* * * * *